Feb. 9, 1971    W. GEFFCKEN    3,561,993
METHOD OF PRODUCING CYCLICALLY EXTENDING LAYERS
Filed April 10, 1968    3 Sheets-Sheet 1
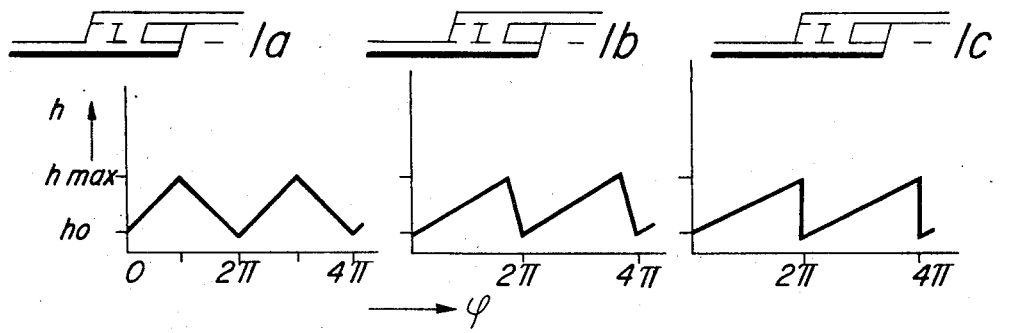
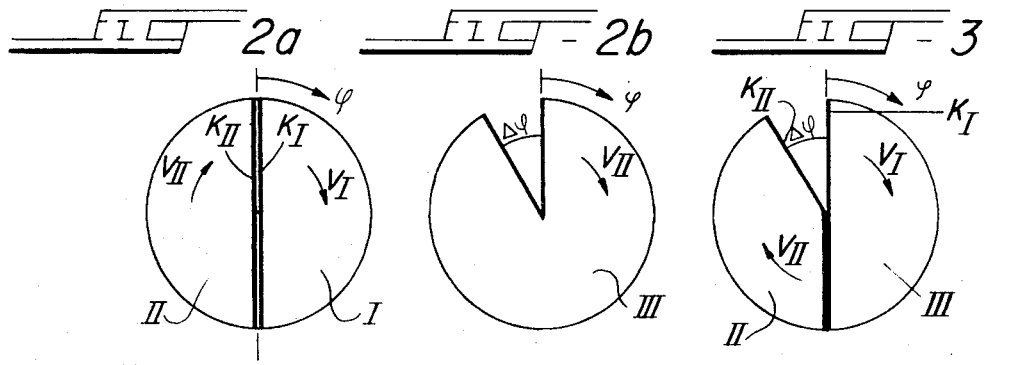
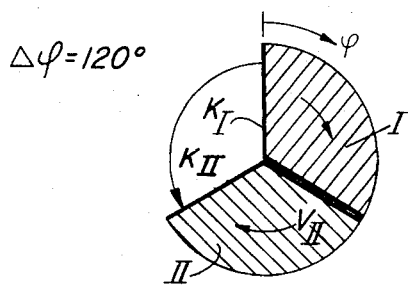
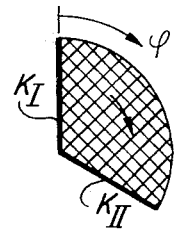
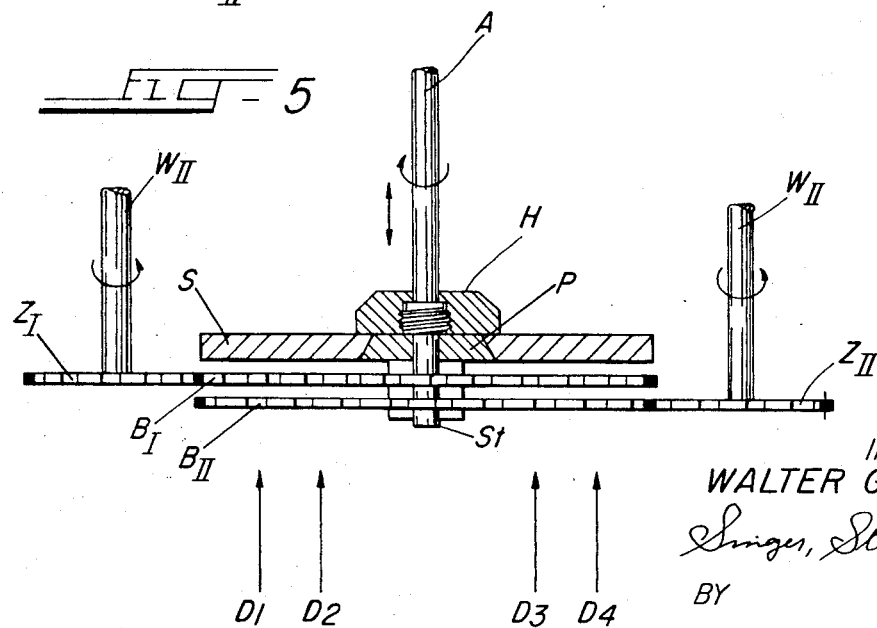
INVENTOR.
WALTER GEFFCKEN
Singer, Stern & Carlberg
BY

INVENTOR.
WALTER GEFFCKEN

1. POSITION

2. POSITION

INVENTOR.
WALTER GEFFCKEN

United States Patent Office 3,561,993
Patented Feb. 9, 1971

3,561,993
METHOD OF PRODUCING CYCLICALLY EXTENDING LAYERS
Walter Geffcken, Mainz, Germany, assignor to JENAer Glaswerk Schott & Gen., Mainz, Germany, a corporation of Germany
Filed Apr. 10, 1968, Ser. No. 720,146
Claims priority, application Germany, Apr. 11, 1967, J 33,412
Int. Cl. B29d 11/00; B44d 5/06
U.S. Cl. 117—38                                    6 Claims

ABSTRACT OF THE DISCLOSURE

It is known to deposit metallic or dielectric layers by vaporization on a straight stripe-formed substrate, whereby the thickness of the layers is linearly increasing along the stripe. Interference filters of such layers show a regular shift of the transmission curve from shorter to longer wavelengths. A recent development shows that it is possible to deposit similar layers in a cyclical form by disposing between the vaporizer and the substrate two diaphragms forming between them a radial slit, whereby these diaphragms are rotated with different speeds relatively to each other about a common axis of rotation. Filters made according to this method have the disadvantage that along one part of the cycle the thickness is steadily increasing, while along the following part it is steadily decreasing. The disclosure shows how the relative movement of the substrate and the diaphragms must be kept for overcoming the said disadvantage and for getting layers, the thickness of which has a uniform change of thickness along the whole cycle with only one interruption where the wavelength drops from the highest to the lowest value.

---

The invention relates to a method of producing cyclically extending layers on a substrate by vaporization, spraying, atomization, etc.

For producing cyclically extending interference filters it is known to move in front of the substrate two sectorial diaphragms at speeds which differ from each other by a certain ratio. This produces radial slits which open and close periodically and through these slits are deposited layers onto the substrate by vaporization, whereby the thickness of these layers is a function of the angular coordinate $\varphi$ (phi) of the substrate.

For the benefit of a clear understanding of the problem underlying the present invention, a brief summarization of the prior art will in the following be included in the description of the invention with reference to the accompanying drawings which in addition to the method of the invention also illustrate some known relationships of the subject in question.

In the drawings:

FIG. 1a is a characteristic of the layer thickness $h$ as a function of the angular coordinate $\varphi$ of the substrate as it is obtained with simple continuously oppositely moving diaphragms of the prior art.

FIG. 1b is a characteristic of the layer thickness $h$ as it is obtained with somewhat more complex diaphragms of the prior art.

FIG. 1c illustrates the ideal characteristic of the layer thickness.

FIG. 2a shows how the diaphragm $B_I$ and therewith its radial edge $K_I$ is moved at a speed $S_I$, and the diaphragm $B_{II}$ and its radical edge $K_{II}$ are moved at a speed $S_{II}$. After one revolution the diaphragm $B_I$ remains stationary until the diaphragm $B_{II}$ has also completed one revolution.

FIG. 2b shows how the diaphragm $B_{II}$ having a sector-shaped aperture $\Delta \varphi$ moves at a constant speed $S_{II}$.

Figure 6:
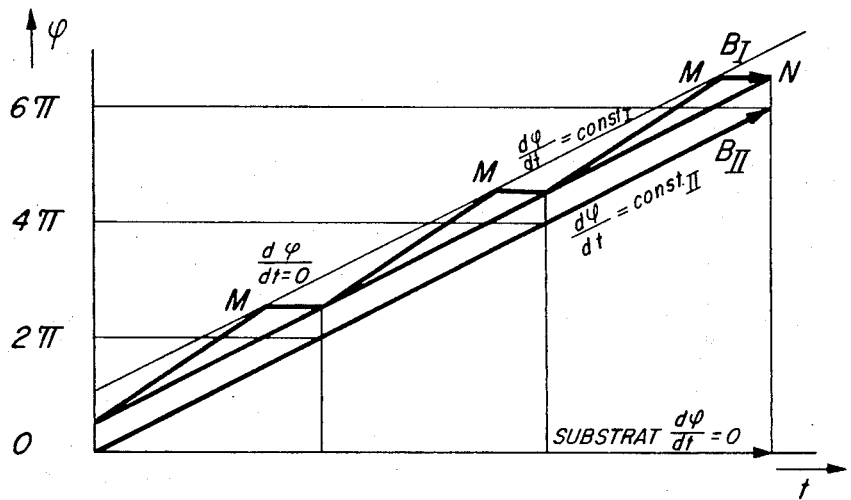

FIG. 3 illustrates the diaphragm effect of a system obtained by adding the effects of the two diaphragm systems 1 and 2 illustrated individually in FIGS. 2a and 2b, respectively. FIG. 3 corresponds as far as the speed is concerned to FIG. 2a, but the edge $K_{II}$ of the diaphragm $B_{II}$ is displaced by $\Delta \varphi \cdot \varphi$ again is the angular coordinate of the substrate.

FIGS. 4a and 4b illustrate the two limit positions of a system of two diaphragms, each of which having a circular distance of 120°. The free aperture reaches the maximum value obtainable with two individual diaphragms. The reference characters have the same meaning as in FIG. 3.

FIG. 5 is a diagrammatic view of an exemplary embodiment of a device for practicing the method according to the invention.

Figure 7:
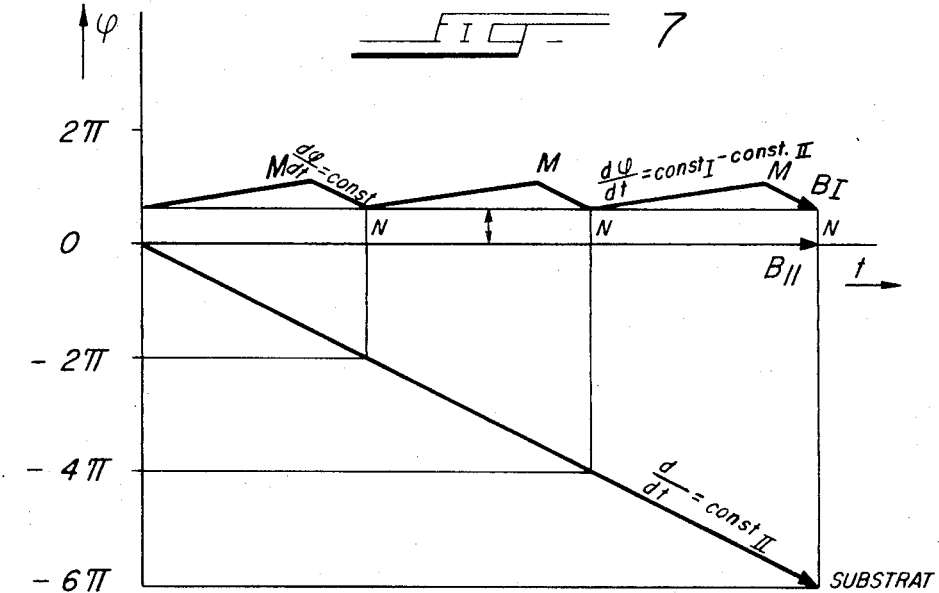

FIGS. 6 and 7 illustrate additional characteristics.

Figure 8:
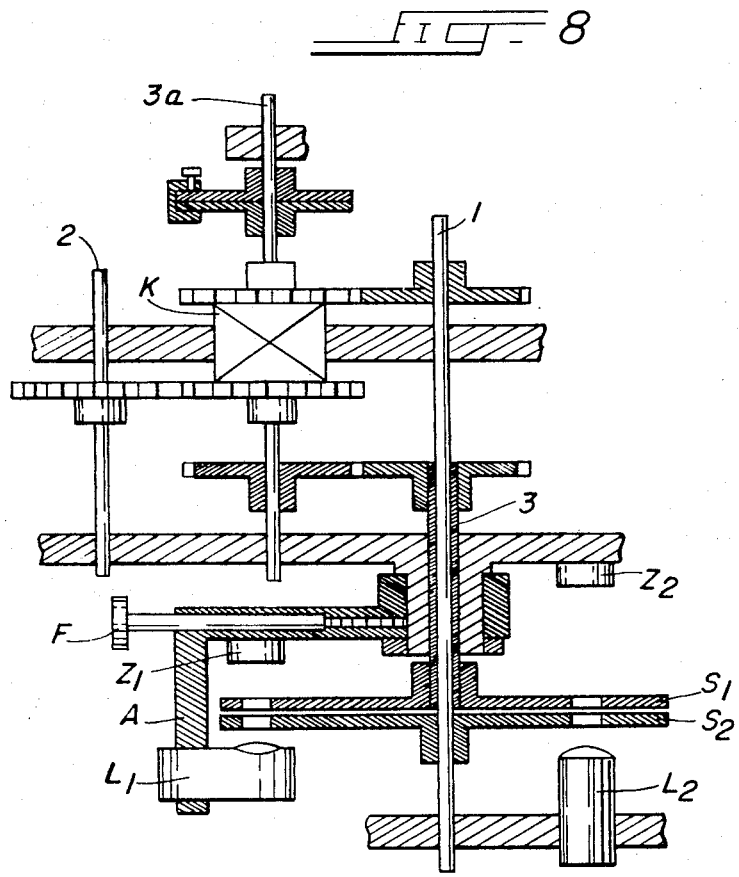

FIG. 8 illustrates another device for practicing the invention.

Figure 9:
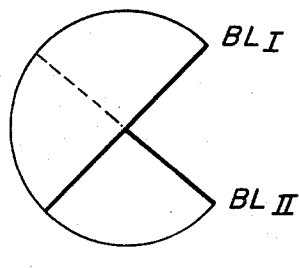
Figure 9A:
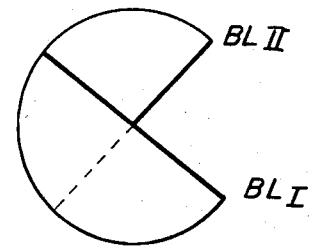

FIGS. 9 and 9a illustrate other diaphragm arrangements.

A considerable disadvantage of the prior art arrangements is that there occurs a regional increase and a subsequent gradual decrease of the layer thickness $h$ on the substrate. In the normal case the slope is the same for both regions, as will be seen from FIG. 1a. When using more complicated multiple slits in the diaphragms, a certain asymmetry may still be obtainable, as shown in FIG. 1b, but the ideal case in which the increase is distributed practically uniformly over the entire angle of rotation of 360° and then drops instantly from the maximum value to the minimum value is not realizable with the known arrangements. This, however, is of particular practical significance, since a filter having a given dispersion, i.e. the rate of change of wavelength per angle unit, requires a diameter that is the smaller, the larger the angle is over which the wavelength change is distributed, which means in practice that the space requirements of the filter are smaller, too.

The object of the present invention is an interference filter in which the gradual increase of the layer thickness is uniformly distributed over 360° where it reaches its maximum value and then drops instantly to its minimum value to launch upon another cycle.

It has been found that this ideal form of a filter characteristic, as shown in FIG. 1c, is attained with surprisingly simple means in that two sufficiently wide diaphragms are caused to rotate about a common axis relative to the substrate at different speeds, whereby only the diaphragm II having the smaller relative speed is rotated continuously, while the diaphragm I having the higher relative speed moves through an angle of 360° or 2π and then remains stationary relative to the substrate until also the diaphragm II has rotated about a complete 360°. At this moment the diaphragm I starts rotating again. The mathematical consequences of this kinematic will be worked out later on. Since the total movements of the two diaphragms comprise each the same exact period, the speed ratio of the two diaphragms may be widely varied. Principally, no strict rule as to the speed of diaphragm II is set up, but the mechanically most straightforward conditions are obtained when the speed of diaphragm II is held constant. Since the inventive rule for the motion of the two diaphragms relates only to the relative angular movement of the diaphragms with respect to the substrate, diaphragm II may also be stationary and substrate and diaphragm I may be moving. Between these two kinematic extremes, there are also possible all other intermediary stages. This becomes important in vacuum atomizing where for the sake of a uniformity of the layers it is desirable to subject the individual portions of the substrate in different positions to the atomizing sources. This change of position may take place relatively slowly, whereas it is advisable to have the diaphragms rotate relatively quickly in order to assure a better uniformity of their motion.

The method according to the invention may not only be applied to interference filters, but may also be used for producing any kind of wedge-shaped layers, such as metal layers for gray filters or filters having dyes sprayed on, for electrically conducting layers, etc.

The technical side of the kinematic according to the invention may be taken care of by various known means. A particularly simple solution is to drive the two diaphragms by separate synchromotors and to have the motor for the diaphragm I photoelectrically turned on by the motion of the diaphragm II and to have it turned off by its own motion. This method is particularly advantageous for the reason that the mutual speed ratio may be controlled during the operation with rather simple means in accordance with a periodic program. This is desirable because in interference filters due to the considerable dispersion of the highly refractive materials used a linear change of the layer thickness, as it would occur with completely constant speeds, will not lead to a constant dispersion as it is desirable for reasons of a ready evaluation of the measurements to be made with the filter.

It is possible, for example, to periodically modify a rotational movement purely mechanically by means of a differential gearing, or also electrically by means of a phase shifter which adjusts the operation of the motors with respect to each other. Of importance is only that the respective angular position of the diaphragm edges is in periodic agreement with the relative rotation of the diaphragm II so that also the phase displacements are strictly periodical.

The theory of the kinematics according to the invention will most easily be understood when one imagines that the two diaphragms used are separated into two partial systems, namely (1) a system 1 comprising two diaphragms the edges of which completely abut each other at the beginning of the motion (see FIG. 2a), and (2) a system 2 having a constant diaphragm aperture (see FIG. 2b).

In system 1 the diaphragm I may rotate at a constant angular velocity $\vartheta_I$ until the circumferential edge $K_I$ has covered exactly $2\pi$ and then comes to a halt; the diaphragm II rotates continuously at a constant velocity $\vartheta_{II}$.

In system 2 the diaphragm II also rotates at a velocity $\vartheta_{II}$ and the circumference $K_I$ starts at $\varphi=0$, while $K_{II}$ at this instant is positioned at $\varphi=-\Delta\varphi$. The angle $\varphi$ indicates the overall position of the systems.

At a constant vaporization speed of the material vaporized during one period, the thickness $h_1(\varphi)$ which was formed by system 1 on the substrate after a time $t_p$ is obviously proportional to the period of time elapsed between the time $t_I(\varphi)$ of the "opening," i.e. the passage of the circumferential edge $K_I$ through the point $\varphi$, and the time $t_{II}(\varphi)$ of the "closing" by the passage of the edge $K_{II}$ through point $\varphi$. Therefore the following relationships apply:

(1) $h_1(\varphi) = K[t_{II}(\varphi) - t_I(\varphi)] =$ proportionality factor

At constant velocities $\vartheta_{II}$ and $\vartheta_I$ (2) $$\frac{t_I(\varphi)}{t_{II}(\varphi)} = \frac{\vartheta_{II}}{\vartheta_I}$$

Further (3) $$t_{II}(\varphi) = \frac{\varphi}{2\pi} tp$$

so that the relation (1) becomes (4) $$h_1 = Ktp \cdot \frac{\varphi}{2\pi}\left(1 - \frac{\vartheta_{II}}{\vartheta_I}\right)$$

The layer thickness $h_1$ is therefore proportional to $\varphi$, i.e. it starts with zero at $\varphi=0$ and runs linearly all the way through to the maximum value at $\varphi=2\pi$.

Since, however, in an interference filter the layer thickness is not to start at zero but with a finite minimum value $h_0$, a vaporizing by system 1 according to FIG. 2a is followed by a second vaporizing step with a diaphragm III (FIG. 2b) so that due to the time constant of $\Delta\varphi$ a constant layer thickness is obtained.

In actual practice, these two layers may be produced concurrently by combining diaphragm II with diaphragm III, which operate at the same speeds, to form a modified diaphragm as illustrated in FIG. 3. This is apparently always possible if diaphragm I is made sufficiently small so that it will not come to an overlapping with the aperture of diaphragm III. A modified diaphragm originates from the regular diaphragm when the edge $K_{II}$ is displaced by $\Delta\varphi$ toward the $+\varphi$ direction. It is equivalent to the effect of the sum of the systems 1 and 2.

The layer thickness $h_2$ produced by the system 2 is $$h_2 = \frac{\Delta\varphi}{2\pi} K \cdot tp$$

after a period $tp$.

The total layer thickness $h(\varphi)$ is $$h(\varphi) = h_1(\varphi) + h_2 = K \cdot tp\left[\frac{\varphi}{2\pi}\left(1 - \frac{\vartheta_{II}}{\vartheta_I}\right) + \frac{\Delta\varphi}{2\pi}\right]$$

$h(\varphi)$ becomes a linear function of $\varphi$.

$tp$ is the time of rotation of diaphragm II.

The extreme values $h_{max}$ and $h_{min}$ are:

$$h_{max} = K \cdot tp\left(1 - \frac{\vartheta_{II}}{\vartheta_I} + \frac{\Delta\varphi}{2\pi}\right)$$

$$h_{min} = K \cdot tp \cdot \frac{\Delta\varphi}{2\pi}$$

The ratio $$\frac{h_{max}}{h_{min}} = 1 + \frac{2\pi}{\Delta\varphi}\left(1 - \frac{\vartheta_{II}}{\vartheta_I}\right)$$

Mostly it is required that $h_{max}/h_{min} \approx 2$. This means that $$1 - \frac{\vartheta_{II}}{\vartheta_I} \approx \frac{\Delta\varphi}{2\pi}$$

If for instance $$\frac{\Delta\varphi}{2\pi} = \frac{1}{3}$$

i.e. $\Delta\varphi = 120°$, then $$\frac{\vartheta_{II}}{\vartheta_I} = \frac{2}{3}$$

This means that when the edge $K_I$ has been rotated 360°, the edge $K_{II}$ has rotated 240°. Thus, when edge $K_I$ has just reached the final position, edge $K_{II}$ is at $$\varphi = 240° - 120° = 120°$$

The diaphragm positions corresponding to these two instants are illustrated in FIG. 4.

It will be noted that in the second position, FIG. 4b, the two diaphragms exactly coincide. Neither diaphragm must not be wider than 120°, but must not be smaller than that value either because otherwise another slit between diaphragm I and diaphragm II would be formed in the initial position of 120° in which they meet.

At $h_{max}/h_{min} = 2$, then, $\Delta\varphi = 120°$ is the maximum value possible if only two movable diaphragms are used. This value is particularly economical in terms of material used as the amount of material sprayed onto the diaphragms is then smallest.

While in the cases described so far the "opening diaphragm" was rotated at a higher speed than the "closing diaphragm," the reverse case is obviously also possible. All that is necessary is to imagine the direction of movement reversed so that the position illustrated in FIG. 4b becomes the initial position and the position illustrated in FIG. 4a becomes the final position. These two possibilities are completely equivalent. In one case $h$ increases with increasing $\varphi$, in the other case $h$ decreases with increasing $\varphi$. This is of particularly practical value in so called metal interference filters, where the two metal layers between which the dielectric lies have to become thinner with increasing wavelength while the dielectric layer increases. Consequently, the desired increase or decrease of layer thickness on one and the same substrate can be produced merely by changing the diaphragm position and the time periods during which the diaphragms are stationary.

Various means are suitable for putting the kinematic relationships according to the invention into practice so that a description of one exemplary embodiment will cover also all other possibilities within the scope of the invention.

Referring to FIG. 5, a vertical shaft A rotates the substrate S. The substrate S is fixed to the lower end of the shaft A by placing it with its central conical inner bore onto the conical carrier disc P, the shaft $St$ of which extends through the center bores of the diaphragms $B_I$ and $B_{II}$, and by threadingly securing the nut H at the lower end of the shaft A to the upper exteriorly threaded pin on the disc P.

A vertical shaft $W_I$ having mounted thereon, at its lower end, a gear wheel $Z_I$ rotates the diaphragm $B_I$, and a shaft $W_{II}$ having mounted thereon a gear wheel $Z_{II}$ rotates the diaphragm $B_{II}$. The entire assembly is enclosed in a vacuum container through which the shaft $W_I$, $W_{II}$ and A extend in a vacuum-tight fashion.

The arrows $D_1$, $D_2$, $D_3$ and $D_4$ symbolize the direction of the flow of vaporization which may issue e.g. from a spray cathode.

Particularly simple is an arrangement in which one diaphragm is practically stationary after having completed a rotative movement of $2\pi$, the substrate rotates at a uniform velocity, and the second diaphragm having a smaller relative velocity than the first diaphragm also performs a rotation of $2\pi$.

FIG. 6 illustrates the above arrangement with the substrate standing still. The motion of the diaphragm $B_{II}$ is clearly a linear function of time $t$. The rotative velocity $d\varphi_{II}/dt$ has the constant value $\text{const}_{II}$. The velocity $d\varphi_s/dt$ of the substrate is zero. The characteristic $B_I$ consists periodically of two straight line segments having slopes $\text{const}_I$ and $0$, respectively. The length of these segments is such that the tangent to this zig-zag curve is parallel to the curve $B_{II}$.

FIG. 7 may immediately be derived from FIG. 6 if the product $\text{const}_{II} \cdot \text{time}$ is subtracted from the values of FIG. 6. Then $d\varphi_{II}/dt=0$ and $d\varphi_s/dt=-\text{const}_{II}$.

The second segment M–N of the characteristic $B_I$ is parallel to the substrate characteristic, the slope is also $-\text{const}_{II}$. The slope of the first segment of characteristic $B_I$ is equal to $\text{const}_I-\text{const}_{II}$. The diaphragm moves along this segment until the relative movement with respect to the substrate has completed exactly one rotation.

In contrast of FIG. 6 where both diaphragms have completed a rotation of $2\pi$ after a given time, in the embodiment of FIG. 7 only the substrate performs a complete rotation. The diaphragm $B_I$ is now only oscillated. The smallest distance $\Delta\psi$ between diaphragm $B_I$ and diaphragm $B_{II}$ may still be selectively determined without any condition attached thereto. The fact that the motion of the diaphragm $B_I$ consists of two partial uniform rotations provides a convenient constructive solution.

The following control mechanism was found to be particularly advantageous:

The substrate is rotated at a velocity $v_1=\text{const}_I$. Its position is transmitted to shaft 1 (FIG. 8) by means of a fixed coupling having a transmission ration of 1:1.

A second shaft 2 is rotated at a velocity $$v_2=\text{const}_I-\text{const}_{II}$$

Since the ration of $v_2:v_1$ is a constant, the shaft 2 may be driven over a suitable gear transmission by the shaft 1.

The motion mechanism of the shaft 3 operating the diaphragm $B_I$ is somewhat complex. The shaft 3 may be coupled with an electrically controlled coupling K selectively either with shaft 1 or with shaft 3 in the ratio 1:1. This coupling has to be in exact periodicity with the motion of the substrate. The phase relations are therefore advantageously controlled by the phases of diaphragm $B_I$ and the substrate. For this purpose the coacially aligned shafts 1 and 3 (FIG. 8) are provided with a disc $S_1$ and $S_2$, respectively, each disc having a radial slit. At a certain position, namely that of point M in FIG. 7, the two slits coincide and a light barrier $L_1$–$Z_1$ at this point is caused to respond. Since the point of coincidence depends on the speed ratio $v_1:v_2$, which by means of different transmission gears may always be adapted to the intended use of the vapor layers, the arm A (FIG. 8) supporting the light barrier $L_1$–$Z_1$ is pivotable and may be fixed in any desired position by means of the screw F.

A second light barrier $L_2$–$Z_2$ is radially displaced relative to the first light barrier and is fixedly secured to the housing. A second slit in the disc $S_2$ and a greater aperture in the disc $S_1$ are adapted to expose the light barrier $L_2$–$Z_2$. Since this light barrier itself includes a slit diaphragm, it responds very accurately to the position of the disc $S_2$.

The operation of the device is as follows:

The light barrier $L_1$–$Z_1$ transmits at the point M (FIG. 7) a signal to a flip-cop circuit by which a rigid coupling between the shaft 3 and the shaft 1 is connected. From this moment on the two discs $S_1$ and $S_2$ remain in the same position relative to each other. At the instant, however, when the slit of $S_2$ moves past the slit of the light barrier $L_2$–$Z_2$, the latter actuates a second flip-flop stage which disconnects shaft 3 from shaft 1 and connects it to shaft 2, as designated at the point N in FIG. 7. From now on shaft 1 and shaft 3 rotate in opposite directions and light barrier $L_1$–$Z_1$ may again be activated. This cycle is continuously repeated.

For adjusting a phase difference between shafts 3 and 3a there is provided a coupling J having a gradation for measuring a given phase displacement of the shafts 3 and 3a. Shaft 3a is fixedly coupled with diaphragm $B_I$. If now the shaft 3 is held in alignment position which corresponds to the point M (FIG. 7), then an adjustment of the phase difference between shaft 3 and shaft 3a causes an enlargement or a reduction, respectively, of the diaphragm aperture $\Delta\psi$ shown in FIG. 7. The greater $\Delta\psi$ becomes at a given speed $v_1$, the smaller is the wedge angle of the layer between the beginning and the end of the operation.

If the diaphragms are so constructed that both their edges are usable as limitations, it is possible to drive their adjustment so far that both diaphragms exchange their functions (FIGS. 9 and 9a). This is of particular importance for the reason that in the second position the wedge angle of the sprayed on layer is exactly reversed from the first position.

Such an effect is especially valuable in interference filters with metallic layers, since in such filters the thickness of the metal layer increases toward shorter wavelengths, while that of the dielectric decreases. The FIGS. 9 and 9a show that in order to attain such a reversal of the wedge angle, the diaphragm $B_{II}$ must not be mounted rigidly but has also to be rotated from position 1 to position 2 prior to spraying on a fresh layer with a reversed wedge angle and under maintaining the vacuum.

The greater expenditure for this construction is justified particularly then, when the diaphragm by means of an eccentric and a cam driven by the substrate motion as is indicated in FIG. 7 is caused to make very small periodic motions. This will provide some modification of the otherwise strictly linear layer thickness which is desirable in the production of filters having a strictly linear wavelength increase because the notable dispersion of the materials used in the filters leads to a distortion of the wavelength linearity in layers of an exactly linear thickness increase.

Other devices of the type performing the just described additional small periodic motion are also within the scope of the invention. The precise value of such a motion, however, is not an object of the present invention.

What I claim is:

1. A method of producing cyclically extending layers forming interference filters on a substrate by coating the surface of said substrate, in which two adjacently placed diaphragms, which have formed a radial slit, rotate with different relative velocity to the substrate about a common axis of rotation, wherein the improvement comprises that first one of said two diaphragms is caused to rotate with a greater relative velocity than the second one and performing a rotational movement of $2\pi$ relative to said substrate and subsequently being stopped until said second diaphragm has completed a rotational movement of $2\pi$ relative to said substrate, said cycle being repeated periodically until the desired layer thickness is obtained.

2. A method according to claim 1, in which the velocity $S_{II}$ of said second diaphragm is held constant relative to said substrate.

3. A method according to claim 1, in which said substrate is held stationary.

4. A method according to claim 1, in which said second diaphragm is held stationary.

5. A method according to claim 1, in which the rotational speed of said second diaphragm is greater than the speed of said substrate.

6. A method according to claim 1, in which the ratio of the relative velocities $S_{II}$ and $S_I$ is 2:3 and the initial radial slit between the first and second diaphragms is approximately 120°.

References Cited

UNITED STATES PATENTS

| | | | |
|---|---|---|---|
| 2,160,981 | 6/1939 | O'Brien | 118—301 |
| 3,442,572 | 5/1969 | Illsley | 118—49 |
| 3,192,796 | 7/1965 | Peeps et al. | 118—2 |
| 2,771,055 | 10/1950 | Kelly et al. | 117—106 |

ALFRED L. LEAVITT, Primary Examiner

M. F. ESPOSITO, Assistant Examiner

U.S. Cl. X.R.

117—33.3, 105.3, 105.4, 106, 107.1